United States Patent
Britsch

[11] 3,891,880
[45] June 24, 1975

[54] HIGH VOLTAGE WINDING WITH PROTECTION AGAINST GLOW DISCHARGE

[75] Inventor: Helmut Britsch, Gebenstorf, Switzerland

[73] Assignee: BBC Brown Boveri & Company, Baden, Switzerland

[22] Filed: May 18, 1973

[21] Appl. No.: 361,648

[30] Foreign Application Priority Data
June 16, 1972 Switzerland.................... 8938/72

[52] U.S. Cl. ............... 310/196; 161/91; 161/163; 161/189
[51] Int. Cl. ........................................... H02k 3/40
[58] Field of Search ........... 310/196, 254, 200, 258, 310/208, 259, 214, 216, 215, 217, 218, 45; 161/91, 90, 163, 189; 336/70; 179/110, 140–144; 317/2

[56] References Cited
UNITED STATES PATENTS

| | | | |
|---|---|---|---|
| 2,201,845 | 5/1940 | Wieseman | 310/208 |
| 2,427,749 | 9/1947 | Schulman | 310/196 |
| 2,707,204 | 4/1955 | Richardson | 174/110 |
| 2,942,327 | 6/1960 | Corry | 161/91 |
| 3,069,302 | 10/1962 | Lewis | 161/163 |
| 3,254,150 | 5/1966 | Rogers | 161/163 |
| 3,508,096 | 4/1970 | Kull | 310/196 |
| 3,622,431 | 11/1971 | Turcksin | 161/91 |
| 3,722,355 | 3/1973 | King | 161/91 |
| 3,723,797 | 3/1973 | Andersson | 310/196 |
| 3,775,628 | 11/1973 | Andersson | 161/163 |

Primary Examiner—R. Skudy
Attorney, Agent, or Firm—Pierce, Scheffler & Parker

[57] ABSTRACT

An insulated high-voltage winding of an electrical machine is protected against glow discharge by application thereto of a wound-on tape of semi-conductive material which has been pre-stretched in its longitudinal direction and which is thereafter contracted by heat treatment. In one embodiment, the tape is a woven structure in which the warp threads consist of a pre-stretched, non-heat set polymer such as polyester and the weft threads being of the same material but dimensionally stable. In a modified embodiment for the woven tape, the weft threads consist of an inorganic material such as glass or asbestos. According to another embodiment the tape is constituted by sections cut from a foil which is pre-stretched in a longitudinal direction and non-heat-set, the foil being made from polymerous carbon fluoride, or polyester or polyvinylidenefluoride. The surface of the foil sections to be wound onto the winding insulation can be pre-treated such as by cauterization or corona discharge to improve its adhesive character.

13 Claims, 2 Drawing Figures

PATENTED JUN 24 1975          3,891,880

HIGH VOLTAGE WINDING WITH PROTECTION AGAINST GLOW DISCHARGE

This invention relates to an improved glow protection for insulated conductors, a process for its manufacture and its application for high-voltage windings of electrical machinery.

A principal object of the invention is to produce a high-quality glow protection in a most simple and economic manner and to produce also high-voltage windings of electrical machines of identical quality.

It is known to wind insulating tape, which can be impregnated and is made preferably from glass-mica, around coils, or bars of windings respectively, used for example in electrical machinery manufactured by use of the all-impregnation process, thereupon to provide the units with a semi-conducting coating as described especially by the Swiss Pat. No. 486,795 — and to insert them after drying into the stator slots, then to complete the various coil and bar connections, and finally to impregnate the entire machine unit, or stator respectively by vacuum-pressure-impregnation, preferably by use of a thermo-hardenable resin.

In order to avoid glow discharges during the operation of machines which contain windings manufactured in the above described manner, the coils or bars are given a semi-conducting coating in known manner, prior to their installation into the slots. The glow protection, provided in this manner, has been satisfactory in many instances.

It is a primary object of the invention to establish an improved glow protection and, in sonsequence thereto, to arrive at a final winding product which is glow-proof, very strong mechanically and which possesses an excellent constant resistivity since the improved glow protection results in a very steady and uniform coefficient of resistance and makes feasible, due to its design, a uniform insulation and impregnation of the windings, preferably by means of a resin.

The invention solves the problem in that the glow protection consists of at least one tape which is electrically semi-conducting, if necessary by the addition of current-conducting means, is pre-stretched and will contract under the influence of temperature, primarily longitudinally.

As a basic material for the glow protection there can be used, for example, woven glass in form of a tape, impregnated with a volatilizable liquid, for example a solvent that can be vaporized, with current-conducting solids, such as graphite particles, being present in the liquid. Such semi-conducting glow protection - as described by the Swiss Pat. No. 486,795 — is made electrically conductive prior to its further processing by a semi-conductive coating at an appropriate resistivity range.

The utilization of the last-mentioned basic material is based on the known fact that in case of the stretch-forming process, fibers with high strength are obtained in that the flow of liquid material emerges from nozzles with larger-sized holes and that the filament so formed is stretched to a multiple of its original length, provided the filament will remain plastic for some period of time and can be stretched during this period. The long macromolecules of such material, for example polyamide filaments, are still unarranged in the unstretched state and possess usually a structure that is similar to a helical spring, and can therefore usually not be further processed to their abnormally high tension, but after stretching the filaments will possess an extraordinarily high strength, due to a greater orientation of the molecules, or crystallites respectively as well as due to an increase in crystallites, whereby the molecules can partially also be longer than the crystallites and overlap from one crystallite to another. It can be assumed that the number of molecules or parts of whole molecules which during the stretching assemble parallel to a crystallite, such as cellulose, will total from 40 to 60 and more. The crystallites will form with each other, in parallel bunches, higher units — the microfibrils —, which can be observed under the electron microscope, which in turn are combined into fibriles, with the number of crystallites forming one fibrile being close to 4,500. Possibly, the chains of molecules, protruding from these arranged domains, do extend in fringe fashion and are matted in such manner that they hold together the entire matter. It appears however, that the intermicellar areas which are located between the arranged domains contain non-crystalline, or amorphous matter.

There exits general agreement, however, that it is not possible to arrive at a strict division between crystalline and amorphous matter, and that the texture of the substance is determined by a great variety of conditions of arrangements between these two extremes. It has even been argued that the amorphous matter actually consists of crystallites of such small sizes that they can not be detected by X-ray photography.

Finally, it should also be pointed out that in the case of certain substances there are present, in addition to crystallites, ring- or cup-shaped spherulites.

It has not been fully determined yet how the cohesion of the molecules within the crystallites, microfibriles, fibriles and within the entire fiber structure is being accomplished. There is in particular the assumption of principal valences in that there are present branchings or cross-linkings of some type between the molecules, for example hydrogen bonds which, in combination with the van-der-Waalsche forces, will insure the cohesion. It follows from the above given explanation that the increase in strength, or the increase in arranged domains respectively, caused by the stretching process, is connected simultaneously with a decrease in tension, so that the filaments which are strengthened in this manner, can be processed further.

It is particularly advantageous if the improved glow protection is accomplished in the form of a woven tape, with its warp threads consisting of pre-stretched, not heat-set filaments of at least one material possessing polymeric structure, and the weft consisting of dimensionally stable filaments of the same material. The warp filaments, pre-stretched but not heat-set, can be formed especially from polyester. It is also very advantageous to prepare the warp threads from pre-stretched, not heat-set filaments of a material with polymeric structure, and the weft thread of the tape from inorganic substances, especially glass or asbestos. It is also practicable to use a glow protection which is cut in tape form from a foil, with the tape pre-stretched in its longitudinal direction and is not set by heat. The foil can consist especially of polymeric carbonfluoride, polyvinylidenefluoride or polyester.

The warp filaments, or the glow protection consisting of woven tape or prepared from a foil in tape form are pre-stretched in cold state, that is stretched prior to use in longitudinal extension in such manner that it will contract correspondingly after installation under proper thermal treatment, in other words at higher temperatures, thereby attaining the desired force fit of a glow protection pretreated in this manner at its base, for example a glass-mica tape surrounding the conductors.

Since the contraction is desired and necessary only in longitudinal direction of the glow protection tape, heat-stabilized filaments can be used in weft direction that are made from the same material as used for the warp threads but will not contract because they have been heat-stabilized. These weft filaments are set in the warm state and under mechanical tension before being processed and used for glow protection, with the setting temperature being kept below the melting point of the material used for the weft filaments.

It will be advantageous and facilitate the glueing to the impregnatable insulating material for the electric conductors, such as a glass-mica tape, if the surface of a glow protection, cut from a foil in the form of a tape, is treated at the side facing such material or tape in that manner that a glow protection cut from foils of fluorinated polymers is cauterized, while a glow protection cut from foils of polyester is subjected to a corona or glow discharge treatment. The side of the foils facing the laminated stacks however reamins untreated because the lack of glueing will facilitate the disassembly of bars or coils in case of damage.

It is particularly advantageous to employ the improved glow protection for the manufacture of high voltage windings in electrical machines if the glow protection is applied to an impregnable insulating material, such as a glass-mica tape, used to insulate bars or coils, and is then subjected to thermal treatment together with the ferrous pack, i.e. the stator iron. The thermal treatment should in this case be applied in such manner that the contraction of the pre-stressed glow protection, taking place longitudinally, ranges between 1 and 12%, preferably between 2 and 5%.

The coil, or bars respectively, of the windings are continuously insulated in their groove or head sections, especially by use of a glass-mica tape. In place of the glow protection carrier tape, covering the glass-mica tape in the manner used heretofore, one of the above described glow protection tapes, or foil respectively, is wound around the bars or coils of the windings as a groove glow protection. The glow protection is thus applied to the fully insulated but not yet impregnated bars or coils prior to their insertion into the ferrous pack. The semi-prepared windings are then inserted into the stator.

During the drying of the stator at temperatures of more than 50°C, usually performed prior to the impregnation, the desired contraction will take place, namely in longitudinal direction of the pre-stretched glow protection tape or foil. Thus there is attained in an advantageous manner a full and complete fitting, or force fit of the semi-conducting glow protection tape or foil onto the insulation, and thus a proper bond with the glass-mica tape which surrounds the bars or coils and forms the conductor insulation.

The improved glow protection offers the additional, specific advantages that the initial values of the dielectric loss angle are lower for the completed machines than was feasible heretofore because the impregnation has now a lesser influence on the resistances. Furthermore, the bond which is being attained between the glow protection and the insulation by the glass-mica tape ensures in addition thereto in a particularly advantageous manner lower tan $\delta$ rates of increase.

Another advantage provided by the use of the improved glow protection tape or foil is the reduction in machine time for the manufacture of the winding as well as the manufacture of the electric apparatus.

To facilitate an understanding of the invention there are shown diagrammatically in the accompanying drawing a design of a winding as produced heretofore and in comparison thereto an example of an improved winding which can be manufactured by means of the above described process, and will be described below in detail.

Figure 1:
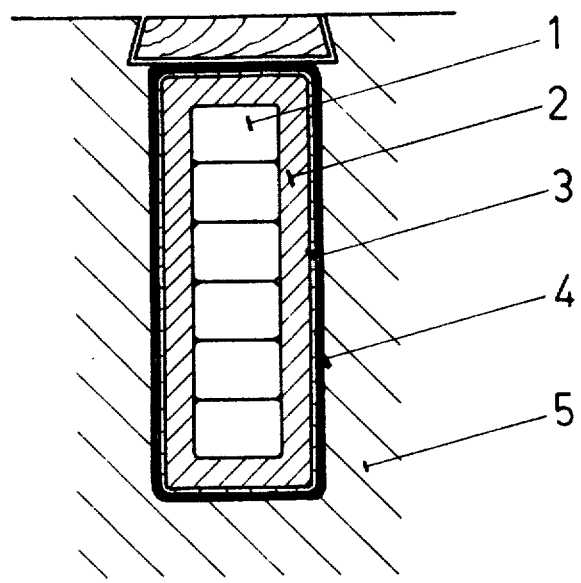
FIG. 1 depicts in cross-section a known design of a conductor insulation.

In FIG. 1 the electrical conductors, consisting of copper, are denoted by numeral 1, the glass-mica tape, surrounding these conductors 1, is denoted by numeral 2, the glow-protection carrier tape, covering tape 2, is denoted by numeral 3, the glow protection coating, applied to tape 3, by numeral 4, and the ferrous stack i.e. the stator iron provided with slots to receive the conductors 1 is denoted by numeral 5.

Figure 2:
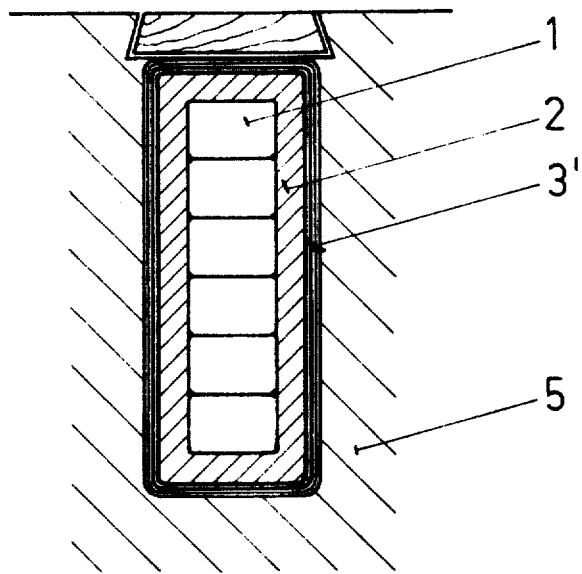
FIG. 2 shows a practical example of the present invention, likewise in cross-section.

In FIG. 2 the conductors and the glass-mica tape are again identified by the numerals 1 and 2 respectively. The glow protection carrier tape with its coating according to FIG. 1 is now replaced by a glow protection tape 3' or glow protection foil 3' which is wound around the glass-mica tape 2. The slotted stator iron is again denoted by numeral 5.

The bars of coils of electric machines, consisting of individual conductors 1, are insluated by means of an impregnatable insulating material, preferably a glass-mica tape 2. Onto this insulation 2 there is placed at least one glow protection in tape form 3' which is made electrically semi-conducting, if necessary by the addition of current conducting means, which has been pre-stretched and which will contract under the influence of temperature in primarily longitudinal direction. The bars or coils are then arranged within slots in the laminated ferrous stator 5 of the machine, are properly spaced, and the various coil or bar connections are accomplished. The bars or coils, together with the ferrous stator 5, are then subjected to a heat treatment, are thereupon uniformly impregnated with a heat-setting synthetic resin and finally hardened, resulting in a final winding product, its electrical coupling with the stator iron being substantially improved, in comparison with previously known techniques due to the constant, invariable coefficient of resistance of the glow protection as well as the insulation, and consequently of the winding, and also due to the avoidance of hollow spaces between the insulation as a whole and the stator iron.

The force fit of the glow protection is accomplished specifically by the use of a type of glow protection where pre-stretched weft filaments, consisting preferably of an organically polymerous material, have been dimensionally stabilized at temperatures ranging approximately from about 120°C to 180°C before being processed into a tape-shaped glow protection, while the warp filaments of the glow protection consist of organic high polymers, pre-stretched in the cold state and not temperature stabilized which under thermal treatment of the wound laminated stator iron at temperatures not exceeding 150°C will contract between 1 and 12%.

I claim:

1. An insulated high-voltage winding installed in the slots of the stator component of an electrical machine and wherein external glow-protection means are provided between the insulation on said winding and the slotted portion of said stator, said external glow-protection means being constituted by a wound-on impregnatable woven tape of an electrically semi-conductive material covering the entire surface of said winding insulation, the warp threads of said woven tape consisting of a pre-stretched non-heat set and heat contractible filamentary material having an organic polymeric structure and the weft threads thereof consisting of dimensionally stable filaments.

2. A glow-protected insulated high-voltage winding as defined in claim 1 wherein the that contraction factor of wrap threads of said woven tape amounts to between 1 and 12 percent, and preferably between 2 and 5 percent.

3. An insulated glow-protected high-voltage stator winding as defined in claim 1 wherein the warp threads of said glow-protection woven tape are constituted by pre-stretched non-heat set filaments of polyester and the weft threads consist of dimensionally stable filaments of the same material.

4. An insulated glow-protected high-voltage stator winding as defined in claim 1 wherein the weft threads of said glow-protection tape consist of dimensionally stable filaments of an inorganic material.

5. An insulated glow-protected high-voltage stator winding as defined in claim 1 wherein the weft threads of said glow-protection tape consist of dimensionally stable filaments of glass.

6. An insulated glow-protected high-voltage stator winding as defined in claim 1 wherein the weft threads of said glow-protection tape consist of dimensionally stable filaments of asbestos.

7. An insulated high-voltage winding installed in the slots of the stator component of an electrical machine and wherein external glow-protection means are provided between the insulation on said winding and the slotted portion of said stator, said external glow-protection means being constituted by a wound-on impregnatable tape of an electrically semi-conductive material covering the entire surface of said winding insulation, said tape being constituted by sections taken from a foil of a non-heat set polymeric material which is pre-stretched in a longitudinal direction and heat contractible in such direction.

8. An insulated glow-protected high-voltage stator winding as defined in claim 7 wherein said glow-protection foil consists of polymeric carbon fluoride.

9. An insulated glow-protected high-voltage stator winding as defined in claim 7 wherein said glow-protection foil consists of polyvinylidenfluoride.

10. An insulated glow-protected high-voltage stator winding as defined in claim 7 wherein said glow-protection foil consists of polyester.

11. An insulated glow-protected high-voltage stator winding as defined in claim 7 wherein the insulation on said winding consists of a glass-mica tape and wherein the surface of said glow-protection foil at the side thereof in contact with the glass-mica tape insulation on said winding is pre-treated to facilitate adhesion thereof to said tape insulation.

12. An insulated glow-protected high-voltage stator winding as defined in claim 11 wherein said glow-protection foil is constituted by fluorinated polymers and the surface thereof in contact with the glass-mica tape insulation is pre-treated by cauterization.

13. An insulated glow-protected high-voltage stator winding as defined in claim 11 wherein said glow-protection foil is constituted by polyester and the surface thereof in contact with the glass-mica tape insulation is pre-treated by a glowdischarge.

* * * * *

UNITED STATES PATENT OFFICE
CERTIFICATE OF CORRECTION

PATENT NO. : 3,891,880
DATED : June 24, 1975
INVENTOR(S) : HELMUT BRITSCH

It is certified that error appears in the above-identified patent and that said Letters Patent are hereby corrected as shown below:

In claim 2:
    line 2 "that" should read — heat — line 3 "wrap" should read — warp —

Signed and Sealed this second Day of September 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,891,880　　　　　　　　　　Dated June 24, 1975

Inventor(s) Helmut Britsch　　　　　　　　Page 1 of 2

It is certified that error appears in the above-identified patent and that said Letters Patent are hereby corrected as shown below:

Columns 3 and 4 as shown on the attached sheet should be included, but will apply exclusively to the grant.

Signed and Sealed this ninth Day of March 1976

[SEAL]

Attest:

RUTH C. MASON
*Attesting Officer*

C. MARSHALL DANN
*Commissioner of Patents and Trademarks* contract, correspondingly after installation under proper thermal treatment, in other words at higher temperatures, thereby attaining the desired force fit of a glow protection pretreated in this manner at its base, for example a glass-mica tape surrounding the conductors.

Since the contraction is desired and necessary only in longitudinal direction of the glow protection tape, heat-stabilized filaments can be used in weft direction that are made from the same material as used for the warp threads but will not contract because they have been heat-stabilized. These weft filaments are set in the warm state and under mechanical tension before being processed and used for glow protection, with the setting temperature being kept below the melting point of the material used for the weft filaments.

It will be advantageous and facilitate the glueing to the impregnatable insulating material for the electric conductors, such as a glass-mica tape, if the surface of a glow protection, cut from a foil in the form of a tape, is treated at the side facing such material or tape in that manner that a glow protection cut from foils of fluorinated polymers is cauterized, while a glow protection cut from foils of polyester is subjected to a corona or glow discharge treatment. The side of the foils facing the laminated stacks however reamins untreated because the lack of glueing will facilitate the disassembly of bars or coils in case of damage.

It is particularly advantageous to employ the improved glow protection for the manufacture of high voltage windings in electrical machines if the glow protection is applied to an impregnable insulating material, such as a glass-mica tape, used to insulate bars or coils, and is then subjected to thermal treatment together with the ferrous pack, i.e. the stator iron. The thermal treatment should in this case be applied in such manner that the contraction of the pre-stressed glow protection, taking place longitudinally, ranges between 1 and 12%, preferably between 2 and 5%.

The coil, or bars respectively, of the windings are continuously insulated in their groove or head sections, especially by use of a glass-mica tape. In place of the glow protection carrier tape, covering the glass-mica tape in the manner used heretofore, one of the above described glow protection tapes, or foil respectively, is wound around the bars or coils of the windings as a groove glow protection. The glow protection is thus applied to the fully insulated but not yet impregnated bars or coils prior to their insertion into the ferrous pack. The semi-prepared windings are then inserted into the stator.

During the drying of the stator at temperatures of more than 50°C, usually performed prior to the impregnation, the desired contraction will take place, namely in longitudinal direction of the pre-stretched glow protection tape or foil. Thus there is attained in an advantageous manner a full and complete fitting, or force fit of the semi-conducting glow protection tape or foil onto the insulation, and thus a proper bond with the glass-mica tape which surrounds the bars or coils and forms the conductor insulation.

The improved glow protection offers the additional, specific advantages that the initial values of the dielectric loss angle are lower for the completed machines than was feasible heretofore because the impregnation has now a lesser influence on the resistances. Furthermore, the bond which is being attained between the glow protection and the insulation by the glass-mica tape ensures in addition thereto in a particularly advantageous manner lower tan δ rates of increase.

Another advantage provided by the use of the improved glow protection tape or foil is the reduction in machine time for the manufacture of the winding as well as the manufacture of the electric apparatus.

To facilitate an understanding of the invention there are shown diagrammatically in the accompanying drawing a design of a winding as produced heretofore and in comparison thereto an example of an improved winding which can be manufactured by means of the above described process, and will be described below in detail.

FIG. 1 depicts in cross-section a known design of a conductor insulation, and

FIG. 2 shows a practical example of the present invention, likewise in cross-section.

In FIG. 1 the electrical conductors, consisting of copper, are denoted by numeral 1, the glass-mica tape, surrounding these conductors 1, is denoted by numeral 2, the glow-protection carrier tape, covering tape 2, is denoted by numeral 3, the glow protection coating, applied to tape 3, by numeral 4, and the ferrous stack i.e. the stator iron provided with slots to receive the conductors 1 is denoted by numeral 5.

In FIG. 2 the conductors and the glass-mica tape are again identified by the numerals 1 and 2 respectively. The glow protection carrier tape with its coating according to FIG. 1 is now replaced by a glow protection tape 3' or glow protection foil 3' which is wound around the glass-mica tape 2. The slotted stator iron is again denoted by numeral 5.

The bars of coils of electric machines, consisting of individual conductors 1, are insluated by means of an impregnatable insulating material, preferably a glass-mica tape 2. Onto this insulation 2 there is placed at least one glow protection in tape form 3' which is made electrically semi-conducting, if necessary by the addition of current conducting means, which has been pre-stretched and which will contract under the influence of temperature in primarily longitudinal direction. The bars or coils are then arranged within slots in the laminated ferrous stator 5 of the machine, are properly spaced, and the various coil or bar connections are accomplished. The bars or coils, together with the ferrous stator 5, are then subjected to a heat treatment, are thereupon uniformly impregnated with a heat-setting synthetic resin and finally hardened, resulting in a final winding product, its electrical coupling with the stator iron being substantially improved, in comparison with previously known techniques due to the constant, invariable coefficient of resistance of the glow protection as well as the insulation, and consequently of the winding, and also due to the avoidance of hollow spaces between the insulation as a whole and the stator iron.

The force fit of the glow protection is accomplished specifically by the use of a type of glow protection where pre-stretched weft filaments, consisting preferably of an organically polymerous material, have been dimensionally stabilized at temperatures ranging approximately from about 120°C to 180°C before being processed into a tape-shaped glow protection, while the warp filaments of the glow protection consist of organic high polymers, pre-stretched in the cold state and not temperature stabilized which under thermal treatment